United States Patent [19]

Dielhof

[11] Patent Number: 4,503,464
[45] Date of Patent: Mar. 5, 1985

[54] GAMMA CORRECTION CIRCUIT FOR TELEVISION

[75] Inventor: Pieter B. Dielhof, Breda, Netherlands

[73] Assignee: U.S. Philips Corporation, New York, N.Y.

[21] Appl. No.: 458,121

[22] Filed: Jan. 14, 1983

[30] Foreign Application Priority Data

Feb. 19, 1982 [NL] Netherlands .............. 8200667

[51] Int. Cl.³ ............................................. H04N 5/20
[52] U.S. Cl. ............................... 358/164; 358/32
[58] Field of Search ............ 358/164, 32, 21, 160, 358/162

[56] References Cited

U.S. PATENT DOCUMENTS 4,200,888 4/1980 Blom ............................ 358/164
4,227,216 10/1980 Blom ............................ 358/164

*Primary Examiner*—Tommy P. Chin
*Attorney, Agent, or Firm*—Thomas A. Briody; William J. Streeter

[57] ABSTRACT

A gamma correction circuit for television, incorporating a gamma corrector (9) having an output (10) with a gamma-corrected signal (S2), a first superposition stage (16) for supplying, relative to the linear input signal (S1) a difference signal (S3) which corresponds to the gamma correction, a second superposition stage (3) for supplying a signal (S1+S3') which is formed by the difference signal (S3), with inverted gamma relative to the linear input signal (S1) which signal (S1+S3') is applied to the gamma corrector (9). As a result thereof values which exceed the peak-white value (w) are not displayed with a picture brightness which is less than the peak-white value (w).

2 Claims, 2 Drawing Figures

GAMMA CORRECTION CIRCUIT FOR TELEVISION

The invention relates to a gamma correction circuit for television, which has an input for receiving the signal to be gamma-corrected and an output for supplying a gamma-corrected signal. This output connected to an input of a first superposition stage, a further input of which is coupled to an input terminal of the gamma correction circuit. The first superposition stage has an output for supplying a difference signal which corresponds to the gamma correction connected to an input of a second superposition stage.

Such a gamma correction circuit is disclosed in U.S. Pat. No. 4,227,216. In said patent the input terminal of the gamma correction circuit is connected to an input of the first superposition stage through a peak-white signal limiting circuit and the output of the gamma corrector is connected to an input of the second superposition stage. The output of the second superposition stage is connected to the output terminal of the gamma correction circuit. As a result thereof the difference signal corresponding to the gamma correction is added as an adjustable correction signal to the signal supplied by the gamma corrector with a minimum gamma, which results in a desired gamma-corrected signal at the output terminal.

The described correction circuit provides a solution to the problem which is encountered when input signal values at the input terminal exceed the peak-white value. The situation in which the signal exceeds the peak-white value occurs frequently at fierce light-reflecting or flashing scene details during normal scene recordings. The problem is that, in the assumed case of a linearly increasing input signal from black level to beyond the peak-white value, the output signal of the gamma corrector exceeds the linear signal between black level and peak-white level and is smaller beyond the peak-white value. The correction signal between black level and the peak-white value enlarges the input signal, that is to say it furnishes the gamma correction but, in contrast therewith, reduces the input signal beyond the peak-white value. Put differently; the correction signal is positive between black level and the peak-white value and negative for values exceeding the peak-white value. For the display picture this means that a fierce light-reflecting or flashing scene detail is displayed with a brightness which is below, instead of above, a brightness associated with the peak-white value. This makes a strange impression on the viewer who expects a local higher picture brightness for the scene detail, but sees a markedly lower picture brightness which is lower than that associated with the peak-white value.

The use of the minimum gamma from which the gamma-increasing correction signal is derived, and limiting the input signal so that a negative correction signal portion cannot be produced results in input signal transitions of a peak-white value not being displayed with a picture brightness which is lower than the peak-white value.

SUMMARY OF THE INVENTION

The invention has for its object to provide a different solution which will omit the signal limiting circuit from the gamma correction circuit. According to the invention a gamma correction circuit second superposition stage has another input which is connected to the input terminal of the gamma correction circuit and an output connected to the input of the gamma corrector for producing a signal which is formed with inverted gamma. The output of the gamma corrector is connected to the output terminal of the gamma correction circuit.

The invention will now be further described by way of example with reference to the accompanying drawings.

DESCRIPTION OF THE FIGURES
DESCRIPTION OF THE PREFERRED EMBODIMENT

In FIG. 1, reference numeral 1 denotes a circuit input terminal to which a television picture or a video signal S1 is applied for gamma correction. The signal S1 may be received from a television pickup device which, like the gamma correction circuit and further circuits, is incorporated in a television camera for black-white or color television. The input signal S1 is shown schematically having a signal variation with time having a linear change from a black level b, for example located at the ground potential of OV, to beyond a peak-white value w, and thence decreasing to the black level b. The signal variation between the black level b and the peak-white value w is associated with a nominal picture or video signal which in accordance with the shown signal S1 has peak-white value transitions which may be, for example, two times the value (w-b).

Figure 1:
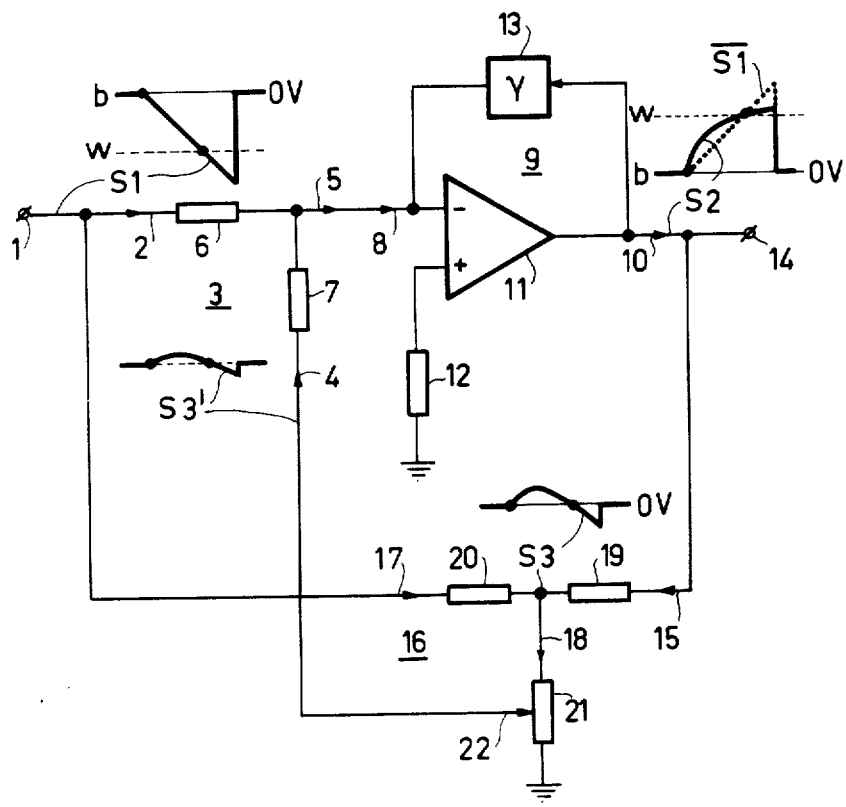
FIG. 1 shows an embodiment of a gamma correction circuit in accordance with the invention and FIG. 2 shows, to explain the operation of the circuit of FIG. 1, a signal variation as a function of the time.

The input terminal 1 is connected to an imput 2 of a superposition stage 3, which includes an input 4 and an output 5. The inputs 2 and 4 are interconnected through two series-arranged resistors 6 and 7 and the junction is connected to the output 5. The output 5 of the superposition state 3 is connected to an input 8 of a gamma corrector 9, which has an output 10. The gamma corrector 9 incorporates a differential amplifier 11 whose (—) input is connected to the input 8 and the (+) input through a resisitor 12 to ground. The differential amplifier output is fed back to the (—) input of the differential amplifier 11 through a non-linear network circuit 13. For a possible construction of the non-linear network circuit 13 incorporating diodes which are biased by voltage-carrying resistors, reference is made to the above-mentioned patent. For an understanding of the invention it is only relevant that the output 10 supplies a gamma-corrected picture or video signal as is shown by means of a signal S2. Signal S2 and the signal S1 in the inverted state is shown by way of comparison as a signal S1. Between the black level b (OV) and the peak-white value w the signal S2 is larger than the signal S1 and it is smaller above the peak value w. By way of example the gamma of the signal variation of the signal S2 is substantially equal to 0.4 to 0.5.

The output 10 of the gamma corrector 9 applies the gamma corrected signal S2 to an output terminal 14 of the gamma correction circuit shown in FIG. 1 and to an input 15 of a superposition stage 16, which includes an input 17 and an output 18. The inputs 15 and 17 are interconnected through two series-arranged resistors 19 and 20 and the junction is connected to the output 18. The input 17 of the superposition stage 16 is connected to the input terminal 1. As a result the stage 16 supplies from the output 18 a signal S3 which is the difference signal between the signals S2 and S1 and is consequently a difference signal which corresponds to the gamma correction.

The output 18 of the superposition stage 16 is connected to ground through a potentiometer 21 and a potentiometer tap 22 is connected to the input 4 of the superposition stage 3. A signal S3' shown next to the input 4 and which, if necessary, is attenuated and has a similar signal variation as the signal S3, is applied to this input 4. Combining the signals S2 and S3' shows that the sum signal at the output 5, with respect to the signal S1, will be decreased between the black level b and the peak-white value w and will be increased for the values which exceed the peak-white value w. As a result thereof the output 5 supplies a signal, which is not shown in FIG. 1, having a signal variation with an increased, adjustable gamma.

Figure 2:
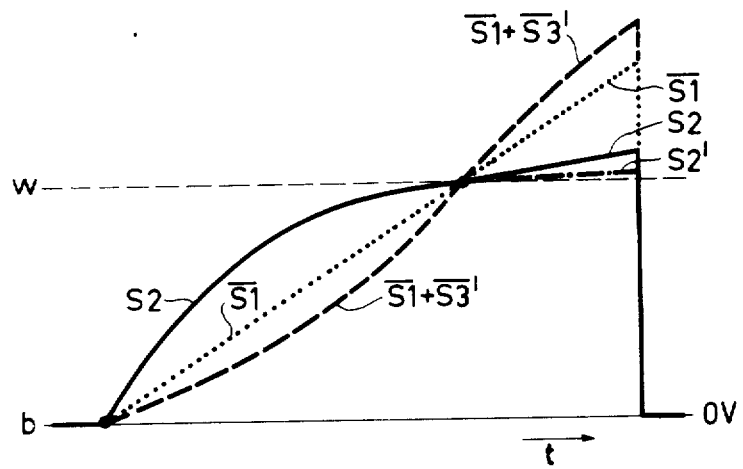

FIG. 2 shows some signal variations on an enlarged scale, as a function of the time t. The sum signal obtained by means of the superposition stage 3 is plotted, for comparison with the signals S2 and $\overline{S1}'$ in the inverted stage as a signal $\overline{S1}+\overline{S3}'$. It appears that the signal S1 with gamma equal to 1 is not applied to the input 8 of the gamma corrector 9. Instead a signal whose gamma exceeds 1 the signal $\overline{S1}+\overline{S3}'$ in the inverted state is applied. The signal thus formed with inverted gamma (the signal $\overline{S1}+\overline{S3}'$ in the inverted state) results in that when a certain gamma is desired for the signal S2, the gamma corrector 9 must produce a larger gamma correction than when the starting point is the linearly varying signal (the signal $\overline{S1}$ in the inverted state). The results when the linear signal variation is the starting point (the signal $\overline{S1}$, stages 3 and 16 absent), is the desired gamma produced by the gamma corrector 9 of a signal variation (S2, S2') shown in FIG. 2, while starting from the signal variation ($\overline{S1}+\overline{S3}'$) with inverted gamma, the signal variation (S2, S2') will occur at the desired gamma. It is apparent that for the described construction of the gamma correction circuit of FIG. 1, signal values of the signal S1 at the input terminal 1 exceeding the peak-white value w do not decrease to below the peak-white value w in the signal at the output terminal 14. In practice it has been found that a gamma correction can be effected with a gamma from approximately 0.4 to higher values up to the factor 1.

It will be obvious that in the connections shown in FIG. 1 linear amplifiers and attenuators, and impedance and voltage level matching circuits may be provided. The gamma correction circuit may further form part of a television camera suitable for black-white or color television, it being possible that in this camera a peak-white value limiting circuit may be arranged in customary manner subsequent to the gamma correction circuit.

What is claimed is:

1. A gamma correction circuit for a television system comprising: an input terminal connected to receive a signal for gamma correction; a gamma corrector having an input and an output; a first superposition stage having a first input connected to said gamma corrector output, a second input connected to said input terminal and an output, said first stage output supplying a difference signal corresponding to the gamma correction; a second superposition stage having a first input connected to said first superposition stage output, a second input connected to said input terminal, and an output connected to supply a signal with inverted gamma to said gamma corrector input; and an output terminal connected to said gamma corrector output; is made to the above-mentioned patent. For an understanding of the invention it is only relevant that the output 10 supplies a gamma-corrected picture or video signal as is shown by means of a signal S2. At the shown signal S2 the signal S1 in the inverted state is shown by way of comparison as a signal $\overline{S1}$. Between the black level b (0V) and the peak-white value w the signal S2 is larger than the signal $\overline{S1}$ and it is smaller above the peak value w. By way of example it is mentioned that the gamma of the signal variation of the signal S2 is substantially equal to 0.4 to 0.5.

The output 10 of the gamma corrector 9 applies the gamma corrected signal S2 to an output terminal 14 of the gamma correction circuit shown in Figure 1 and to an input 15 of a superposition stage 16, which further has an input 17 and an output 18. The inputs 15 and 17 are interconnected via two series-arranged resistors 19 and 20 and the junction is connected to the output 18. The input 17 of the superposition stage 16 is connected to the input terminal 1. As a result thereof the stage 16 supplies from the output 18 a signal S3 which is the difference signal between the signals S2 and S1 and is consequently a difference signal which corresponds to the gamma correction.

The output 18 of the superposition stage 16 is connected to ground via a potentiometer 21 and a potentiometer tap 22 is connected to the input 4 of the superposition stage 3. A signal S3' shown next to the input 4 and which, if necessary, is attenuated and has a similar signal variation as the signal S3, is applied to this input 4. Combining the signals S1 and S3' shows that the sum signal at the output 5, with respect to the signal S1, will be decreased between the black level b and the peak-white value w and will be increased for the values which exceed the peak-white value w. As a result thereof the output 5 supplies a signal, which is not shown in Figure 1, having a signal variation with an increased, adjustable gamma.

Figure 2 shows some signal variations on an enlarged scale, as a function of the time t. The sum signal obtained by means of the superposition stage 3 is plotted, for comparison with the signals S2 and S1' in the inverted stage as a signal S1+S3. It appears that the signal S1 with gamma equal to 1 is not applied to the input 8 of the gamma corrector 9, but a signal whose gamma exceeds 1 (the signal S1+S3. In the inverted state). The signal thus formed with inverted gamma (the signal S1+S3' in the inverted state) results in that when a certain gamma is desired for the signal S2 the gamma corrector 9 must produce a larger gamma correction than when the starting point is the linearly varying signal (the signal S1 in the inverted state). This results in that when the linear signal variation is the starting point (the signal S1, stages 3 and 16 absent), the desired gamma produced by the gamma corrector 9 would result in a signal variation (S2, S2') shown in Figure 2, while starting from the signal variation (S1+S3') with inverted gamma, the signal variation (S2, S2') will occur at the desired gamma. It is apparent that for the described construction of the gamma correction circuit of Figure 1 it is ensured that for signal values in the signal S1 at the input terminal 1 exceeding the peak-white value w do not decrease to below the peak-white value w in the signal at the output terminal 14. In practice it has been found that a gamma correction can be effected with a gamma from approximately 0.4 to higher values up to the factor 1.

It will be obvious that in the connections shown in Figure 1 linear amplifiers and attenuators, and impedance and voltage level matching circuits may be provided. The gamma correction circuit may further form part of a television camera suitable for black-white or color television, it being possible that in this camera a peak-white value limiting circuit may be arranged in customary manner subsequent to the gamma correction circuit.

2. A television camera provided with a gamma correction circuit as claimed in claim 1.

* * * * *

UNITED STATES PATENT AND TRADEMARK OFFICE
CERTIFICATE OF CORRECTION

PATENT NO. : 4,503,464
DATED : Mar. 5, 1985
INVENTOR(S) : DIELHOF

It is certified that error appears in the above-identified patent and that said Letters Patent is hereby corrected as shown below:

Column 2, Lines 14-15 delete in their entirety.

Between lines 20 & 21 insert --DESCRIPTION OF THE PREFERRED EMBODIMENT--;

Column 4, line 7, delete in its entirety and insert --output.--;

lines 8 - 68 delete in their entirety;

Column 5, lines 1 - 9 delete in their entirety;

Column 6, lines 1 - 5 delete in their entirety.

Signed and Sealed this

Eighth Day of October 1985

[SEAL]

Attest:

Attesting Officer

DONALD J. QUIGG

Commissioner of Patents and Trademarks—Designate